United States Patent
Park et al.

(10) Patent No.: US 12,353,352 B2
(45) Date of Patent: Jul. 8, 2025

(54) METHOD FOR IMPLEMENTING RE-INSTANTIATION FOR DATABASE

(71) Applicant: TmaxTibero Co., Ltd, Gyeonggi-do (KR)

(72) Inventors: Jeonghyuk Park, Gyeonggi-do (KR); Dongyun Yang, Seoul (KR); Sangyoung Park, Seoul (KR)

(73) Assignee: TMAXTIBERO CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/821,222

(22) Filed: Aug. 22, 2022

(65) Prior Publication Data
US 2023/0325349 A1 Oct. 12, 2023

(30) Foreign Application Priority Data
Mar. 28, 2022 (KR) .......... 10-2022-0038285

(51) Int. Cl.
*G06F 16/11* (2019.01)
(52) U.S. Cl.
CPC ................. *G06F 16/122* (2019.01)
(58) Field of Classification Search
None
See application file for complete search history.

(56) References Cited

U.S. PATENT DOCUMENTS

| | | | |
|---|---|---|---|
| 8,874,508 B1 * | 10/2014 | Mittal | G06F 11/2048 707/610 |
| 10,120,764 B1 * | 11/2018 | Ramachandran | G06F 11/203 |
| 10,936,545 B1 * | 3/2021 | Chockalingam | G06F 11/1448 |
| 11,120,047 B1 * | 9/2021 | Hoffmann | G06F 16/273 |
| 2019/0095297 A1 * | 3/2019 | Neall | G06F 11/2082 |
| 2020/0001947 A1 | 1/2020 | Yoon et al. | |
| 2020/0125449 A1 * | 4/2020 | Mao | G06F 11/1466 |
| 2020/0159433 A1 * | 5/2020 | Miyamura | G06F 3/0643 |

FOREIGN PATENT DOCUMENTS

| | | |
|---|---|---|
| KR | 10-0608394 | 8/2006 |
| KR | 10-1430239 | 8/2014 |
| KR | 10-1922044 | 6/2018 |

OTHER PUBLICATIONS

Office Action, Korean Intellectual Patent Office, Application No. 10-2022-0038285, Aug. 22, 2024.

* cited by examiner

*Primary Examiner* — Neveen Abel Jalil
*Assistant Examiner* — John J Morris
(74) *Attorney, Agent, or Firm* — Gottlieb, Rackman & Reisman, PC

(57) ABSTRACT

Disclosed is a method for implementing re-instantiation for a database, which is performed by a computing device, which may include: acquiring at least one redo log; acquiring an address of a data block based on the at least one redo log; acquiring information on changed matters included in a control file based on the at least one redo log; and modifying a first database based on the address of the data block and the information on the changed matters.

6 Claims, 4 Drawing Sheets

METHOD FOR IMPLEMENTING RE-INSTANTIATION FOR DATABASE

CROSS-REFERENCE TO RELATED APPLICATIONS

This application claims priority to and the benefit of Korean Patent Application No. 10-2022-0038285 filed in the Korean Intellectual Property Office on Mar. 28, 2022, the entire contents of which are incorporated herein by reference.

TECHNICAL FIELD

The present disclosure relates to a data processing field, and more particularly, to a method for implementing re-instantiation for a database.

BACKGROUND ART

Businesses of enterprises are rapidly expanding with explosive data growth and the emergence of diverse environments and platforms. As new business environments emerge, more efficient and flexible data services and information processing, and data management functions are needed. In response to these changes, a research is continued on dualization technology of databases to solve problems of high performance, high availability, and scalability which are foundations of corporate business implementation.

Dualization of the database may mean replicating and managing the same database so as to minimize interruption of a database service in a failure situation of the database due to a system error or physical damage to a medium. In a dualized database environment, synchronization between an original database and a replication database may be continuously performed.

Failover may mean that the replication database automatically performs the service instead of the original database in a situation in which the failure occurs in the original database, so the service cannot be performed any longer. Since the failover occurs in the failure situation of the original database, the failover may occur in a state in which all data changes of the original database are not synchronized with the replication database.

Re-instantiation may mean performing synchronization between databases in order to maintain dualization even after the failover. For example, the re-instantiation may mean performing synchronization between an existing original database and a new original database in order to write the existing original database to replication of the new original database.

SUMMARY OF THE INVENTION

The present disclosure has been made in an effort to provide a method for smoothly implementing re-instantiation for a database.

However, technical objects of the present disclosure are not restricted to the technical object mentioned as above. Other unmentioned technical objects will be apparently appreciated by those skilled in the art by referencing to the following description.

An exemplary embodiment of the present disclosure provides a method for implementing re-instantiation for a database, which is performed by a computing device, which may include: acquiring at least one redo log; acquiring an address of a data block based the on at least one redo log; acquiring information on changed matters included in a control file based on the at least one redo log; and modifying a first database based on the address of the data block and the information on the changed matters.

In an exemplary embodiment, the at least one redo log may include a log in which the first database is not synchronized with a second database.

In an exemplary embodiment, the address of the data block may include an address for at least one data block in which data is modified among all data blocks included in the first database.

In an exemplary embodiment, the control file may include information on the changed matters related to at least one of change or modification of the data, which occured in the first database.

In an exemplary embodiment, the modifying of the first database based on the address of the data block and the information on the changed matters may include acquiring, from the second database, reference data for the data block corresponding to the address of the data block included in the first database, and applying the reference data acquired from the second database to the data block included in the first database.

In an exemplary embodiment, the modifying of the first database based on the address of the data block and the information on the changed matters may include applying the changed matters to the control file in a reverse order based on the information on the changed matters.

In an exemplary embodiment, the method may include comparing the modified first database and the second database, and determining whether the modified first database is synchronized with the second database.

In an exemplary embodiment, the method may include reperforming the method in the first database when it is determined that the first database and the second database are not synchronized with each other.

Another exemplary embodiment of the present disclosure provides non-transitory computer readable medium including a computer program, in which the computer program executes a method for implementing re-instantiation for a database, which is performed by a computing device, and the method may include: acquiring at least one redo log; acquiring an address of a data block based on the at least one redo log; acquiring information on changed matters included in a control file based on the at least one redo log; and modifying a first database based on the address of the data block and the information on the changed matters.

Still another exemplary embodiment of the present disclosure provides a computing device which may include: a processor; and a storage unit, in which the processor is configured to acquire at least one redo log, acquire an address of a data block based on the at least one redo log, acquire information on changed matters included in a control file based on the at least one redo log, and modify a first database based on the address of the data block and the information on the changed matters.

According to an exemplary embodiment of the present disclosure, a method can smoothly perform re-instantiation for a database.

Effects which can be obtained in the present disclosure are not limited to the aforementioned effects and other unmentioned effects will be clearly understood by those skilled in the art from the following description.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the detailed matters.

DETAILED DESCRIPTION

Figure 1:
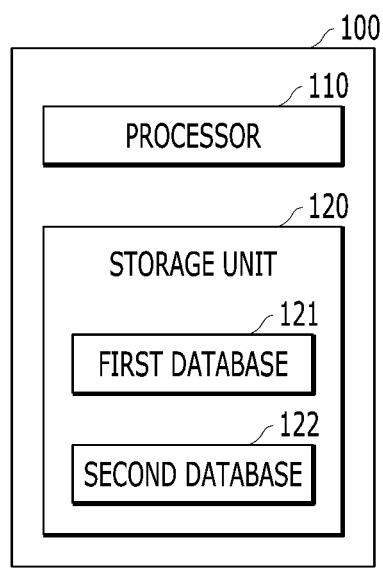
FIG. 1 is a schematic block diagram of a computing device according to some exemplary embodiments of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

FIG. 1 is a schematic block diagram of a computing device according to some exemplary embodiments of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and may include only some of the disclosed components.

The computing device 100 according to some exemplary embodiments of the present disclosure may mean a node constituting a system for implementing the exemplary embodiments of the present disclosure. The computing device 100 may mean a predetermined type of client or a predetermined type of server. The components of the computing device 100 are exemplary, and some components may be excluded or an additional component may also be included. As an example, when the computing device 100 includes the client, an output unit (not illustrated) and an input unit (not illustrated) may be included in the range.

For example, the client may mean a node(s) in a database system having a mechanism for communication through the network. As an example, the client may include a predetermined electronic device having connectivity with a personal computer (PC), a laptop computer, a workstation, a terminal, and/or the network. Further, the client may include a predetermined server implemented by at least one of agent, application programming interface (API), and plug-in. For example, the client may be related to a user who uses the computing device 100 for performing database management.

The computing device 100 according to some exemplary embodiments of the present disclosure as a system in which the user shares a network resource may be a device of a cloud environment in which the user rents network resources of a number as necessary through a network at a desired time point. For example, the computing device 100 may include a deployment model such as public cloud, private cloud, hybrid cloud, or community cloud or a service model such as infrastructure as a service (IaaS), platform as a service (PaaS), or software as a service (SaaS).

The computing device 100 according to some exemplary embodiments of the present disclosure may include a predetermined type computer system or computer device such as a microprocessor, a mainframe computer, a digital single processor, a portable device, and a device controller. For example, the computing device 100 according to an exemplary embodiment of the present disclosure may include a database server. The computing device 100 may include a database management system (DBMS) and a persistent storage. In FIG. 1, one computing device 100 is exemplarily illustrated, but it will be apparent to those skilled in the art that other computing devices may also be included in the scope of the present disclosure.

The computing device 100 may include one or more processors 110 and a storage unit 120. In an exemplary embodiment, the storage unit 120 may include a persistent storage. In an exemplary embodiment, the storage unit 120 may include one or more memories including a buffer cache. In an exemplary embodiment, the DBMS may be operated by the processor 110 on the memory.

Here, the memory as a primary storage device directly accessed by the processor 110, such as a random access memory (RAM) including a dynamic random access memory (DRAM), a static random access memory (SRAM), etc., may mean a volatile storage device in which stored information is momentarily erased when power is turned off, but is not limited thereto. The memory may be operated by the processor 110. In an additional aspect, the memory may include a buffer cache and data may be stored in a data block of the buffer cache. The data may be written on the persistent storage by a background process.

The persistent storage may mean a non-volatile storage medium which may consistently store predetermined data, such as a storage device based on a flash memory and/or a battery-backup memory in addition to a magnetic disk, an optical disk, and a magneto-optical storage device. The persistent storage may communicate with the processor 110 and the memory of the computing device 100 through various communication means. In an additional exemplary embodiment, the persistent storage is positioned outside the computing device 100 to communicate with the computing device 100. According to an exemplary embodiment of the present disclosure, the persistent storage and the memory may be collectively called a storage unit 120. The DBMS as a program for permitting the database server 100 to perform predetermined types of operations of the database including retrieval, insertion, modification, and/or deletion of required data in the computing device 100 may be implemented by the processor 110 in the memory of the computing device 100 as described above.

The computing device 100 may transmit/receive data to/from other computing devices (e.g., the client or database management server) through a communication unit (not illustrated). The communication unit according to an exemplary embodiment of the present disclosure may use a predetermined type of network. The network may include a predetermined type of short-range or long-range network or a predetermined type of wired or wireless network. The communication unit in the present disclosure may be configured regardless of communication modes such as wired and wireless modes and constituted by various communication networks including a personal area network (PAN), a wide area network (WAN), and the like. Further, the communication unit may operate based on known World Wide Web (WWW) and may adopt a wireless transmission technology used for short-distance communication, such as infrared data association (IrDA) or Bluetooth.

In an exemplary embodiment of the present disclosure, the processor 110 may be constituted by one or more cores and may include processors for data analysis and/or processing, which include a central processing unit (CPU), a general purpose graphics processing unit (GPGPU), a tensor processing unit (TPU), and the like of the computing device 100.

According to an exemplary embodiment of the present disclosure, the storage unit 120 may store any type of information generated or determined by the processor 110 and any type of information received by the computing device 100. According to an exemplary embodiment of the present disclosure, the storage unit 120 may be a storage storing computer software which performs the operations according to the exemplary embodiments of the present disclosure by the processor 110. Therefore, the storage unit 120 may also mean computer reading media for storing a software code required for performing the exemplary embodiment of the present disclosure, data which becomes an execution target of the code, and an execution result of the code. For example, the storage unit 120 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. According to an exemplary embodiment of the present disclosure, the storage unit 120 may also include a web storage performing a storage function on the Internet.

The storage unit 120 may include a first database 121 and a second database 122. When the first database 121 and/or the second database 122 are/is modified, the storage unit 120 may modify data stored in a storage corresponding to the first database 121 and/or the second database 122. For example, when the first database 121 is modified, the storage unit 120 may modify data stored in a first storage corresponding to the first database 121.

According to some exemplary embodiments of the present disclosure, in the computing device 100, only the first database 121 may be present in the storage unit 120 and an external device may be present in the second database 122. The external device may be, for example, the client or the database management server. The computing device 100 may also transmit/receive data of the second database 122 stored in the external device through the external device.

According to some other exemplary embodiments of the present disclosure, in the computing device 100, only the second database 122 may be present in the storage unit 120 and the first database 121 may be present in the external device. The computing device 100 may also transmit/receive data of the first database 121 stored in the external device through the external device.

According to some still other exemplary embodiments of the present disclosure, in the computing device 100, there is no database in the storage unit 120 and different external devices may also be present in the first database 121 and the second database 122, respectively. Therefore, the computing device 100 may communicate with each of the external device in which the first database 121 is present and the external device in which the second database 122 is present. The computing device 100 serves an agent to transmit/receive data between the first database 121 and the second database 122 to control the first database 121 and the second database 122 externally.

Meanwhile, the computing device 100 according to some exemplary embodiments of the present disclosure may replicate and manage the same database so as to minimize interruption of the database service in the failure situation of the database due to the system error or physical damage to the medium. Therefore, the computing device 100 may continuously perform synchronization between the original database (the first database 121) and the replication database (the second database 122).

The computing device 100 may perform the failover. Failover may mean that the replication database (the second database 122) automatically performs the service instead of the original database (the first database 121) in a situation in which the failure occurs in the original database (the first database 121), so the service cannot be performed any longer. Since the failover occurs in the failure situation of the original database (the first database 121), the failover may occur in a state in which all data changes of the original database (the first database 121) are not synchronized with the replication database (the second database 122).

The computing device 100 may implement re-instantiation for the database. Re-instantiation may mean performing synchronization between databases in order to maintain dualization even after the failover. Therefore, the computing device 100 may perform synchronization between an existing original database (the first database 121) and a new original database (the second database 122) in order to write the existing original database (the first database 121) to replication of the new original database (the second database 122). Synchronization may mean updating the first database 121 or recovering a state before the update so that the first database 121 of the computing device 100 stores the same data as the second database 122.

Specifically, the processor 110 of the computing device 100 may acquire at least one redo log in order to implement re-instantiation for the database. At least one redo log may be information capable of identifying change contents for a structure and an organization for the data in the database and/or change contents related to the table, a column, the index, the data, etc., or a file including the information. For example, at least one redo log may be information capable of identifying contents related to change contents for a structure of data and an organization in the first database 121.

At least one redo log may include a log which is not synchronized with the second database 122 in the first database 121. The log and the redo log in the present specification may be used interchangeably with each other.

The first database 121 may be the existing original database in which the failure occurs internally. Therefore, the first database 121 may be changed to the replication database of the second database 122 due to the failover. In this case, the first database 121 may be in a state in which all data changes are not synchronized with the second database 122. For example, at least redo log generated after the time point when the failure occurs in the first database 121 may not be applied to the second database 122.

Accordingly, the processor 110 may determine at least redo log generated after the time point when the failure occurs in the first database 121 as a log which is not synchronized with the second database 122 in the first database 121. In addition, the processor 110 may acquire at least one redo log including the log which is not synchronized with the second database 122 in the first database 121 in order to synchronize the first database 121 and the second database 122.

The processor 110 may acquire a data block address (DBA) based on at least one redo log. At least one redo log may include the data block address.

The data block may mean an aggregate of the data. For example, the data block may include one table storing the data. As another example, the data block may also include a plurality of tables storing a plurality of data. A size of the data block may be variously set based on setting of the user, a storable space of the storage unit 120, etc. For example, the size of the data block may be set to 1 Megabyte, 2 Megabytes, etc.

The address of the data block may include information regarding the position of the data block. For example, the data block address may include information indicating a position at which the data block is stored in the storage unit 120. Therefore, the processor 110 may access the data block based on the data block address.

The processor 110 may acquire information on changed matters included in a control file based on at least one redo log. At least one redo log may include the control file.

The control file may include information on the structure and/or the organization of the storage unit 120. For example, the control file may include a path and a name of the data included in the storage unit 120, information of the log, etc.

When the changed matters for the structure and/or the organization of the storage unit 120 are generated, information on the changed matters of the control file may be updated. Accordingly, the control file may include information on changed matters related to at least one of change or modification of the data generated in the first database 121.

According to some other exemplary embodiments of the present disclosure, at least one redo log may include information on the changed matters included in the control file. In addition, the control file may be stored in the storage unit 120 apart from the redo log. Therefore, the processor 110 may modify the control file separately stored from the redo log in the storage unit 120 based on the information on the changed matters included in the control file.

The processor 110 may modify the first database based on the data block address and the information on the changed matters. For example, the processor 110 may acquire, from the second database 122, reference data for the data block corresponding to the address of the data block included in the first database 121. In addition, the processor 110 may apply the reference data acquired from the second database 122 to the data block included in the first database 121. Therefore, the data blocks included in the first database 121 and the second database 122 may be the same as each other.

The processor 110 may apply the changed matters to the control file in a reverse order based on the information on the changed matters. Therefore, the processor 110 may recover the control file to the state at the time point before the failure occurs in the first database 121. The processor 110 recovers the data block of the first database 121 and the control file to the state at the same time point to control the data block of the first database 121 and the control file to be matched with each other.

The processor 110 compares the modified first database 121 and the second database 122 to determine whether the modified first database 121 and the second database 122 are synchronized.

For example, the processor 110 may compare the data block of the modified first database 121 and the data block of the second database 122. When the data block of the modified first database 121 and the data block of the second database 122 are the same as each other, the processor 110 may determine that the modified first database 121 and the second database 122 are synchronized with each other. Further, when the data block of the modified first database 121 and the data block of the second database 122 are not the same as each other, the processor 110 may determine that the modified first database 121 and the second database 122 are not synchronized with each other.

As another example, the processor 110 may compare the control file of the modified first database 121 and the control file of the second database 122. When the control file of the modified first database 121 and the control file of the second database 122 are the same as each other, the processor 110 may determine that the modified first database 121 and the second database 122 are synchronized with each other. Further, when the control file of the modified first database 121 and the control file of the second database 122 are not the same as each other, the processor 110 may determine that the modified first database 121 and the second database 122 are not synchronized with each other.

As still another example, the processor 110 may compare the data block and the control file of the modified first database 121 and the data block and the control file of the second database 122. When the data block and the control file of the modified first database 121 and the data block and the control file of the second database 122 are the same as each other, the processor 110 may determine that the modified first database 121 and the second database 122 are synchronized with each other. When the data block and the control file of the modified first database 121 and the data block and the control file of the second database 122 are not the same as each other, the processor 110 may determine that the modified first database 121 and the second database 122 are not synchronized with each other.

When the processor 110 determines that the first database 121 and the second database 122 are not synchronized with each other, the processor 110 may reperform the method performed in order to implement the re-instantiation for the database in the first database 121. For example, when the processor 110 determines that the first database 121 and the second database 122 are not synchronized with each other, the processor 110 may reperform a process of acquiring at least one redo log in the first database 121, acquiring the data block address based on at least one redo log, acquiring the information on the changed matters included in the control file based on at least one redo log, and modifying the first database 121 based on the data block address and the information on the changed matters.

The processor 110 may clear at least one redo log 12 acquired after the process is terminated. The clear may mean an initial state without at least one redo log 12 acquired by the processor 110. Therefore, the processor 110 may allow at least one redo log 12 to be cleared (deleted) from the storage unit 120 by clearing at least one redo log 12 acquired, after the process is terminated.

Figure 2:
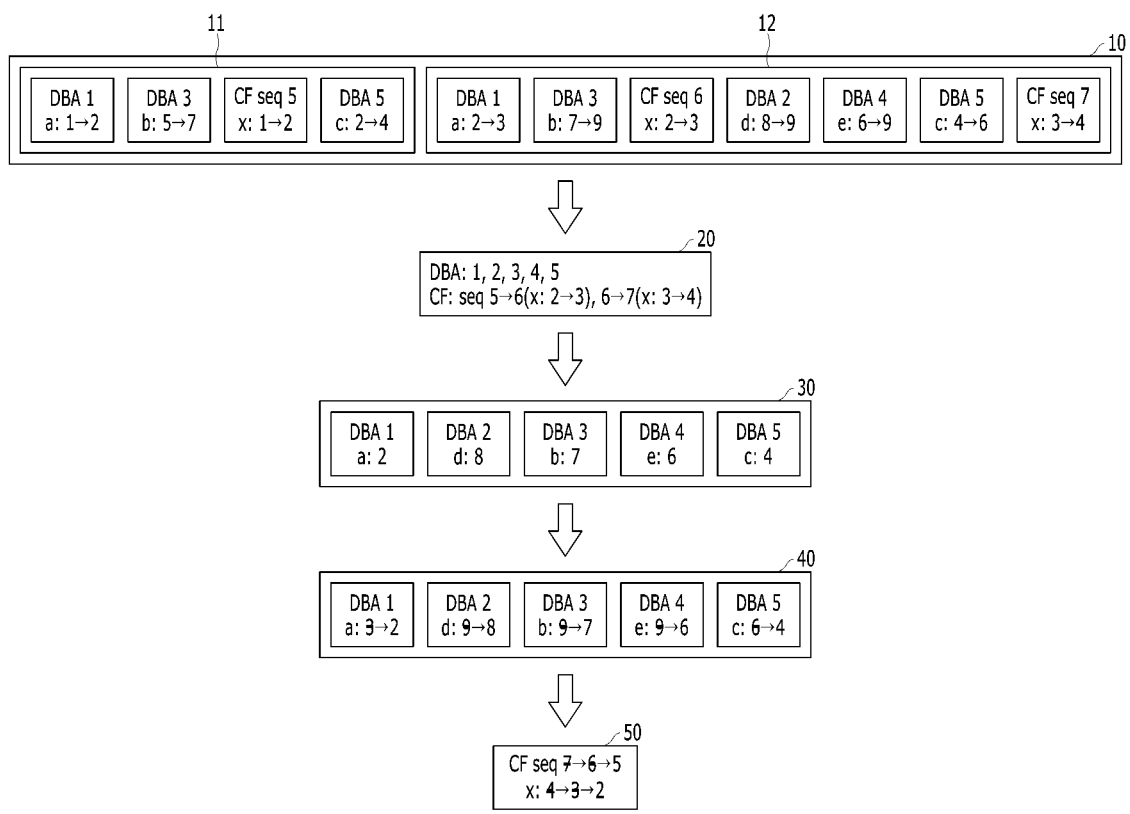
FIG. 2 is a diagram illustrating a process of implementing re-instantiation for a database by a computing device according to some exemplary embodiments of the present disclosure.

FIG. 2 is a diagram illustrating a process of implementing re-instantiation for a database by a computing device according to some exemplary embodiments of the present disclosure.

Referring to FIG. 2, the processor 110 of the computing device 100 may acquire at least one redo log 12 among all redo logs 10. Some redo logs 11 among all redo logs 10 may include a log in which the first database 121 is synchronized with the second database 122. At least one redo log 12 among all redo logs 10 may include a log in which the first database 121 is not synchronized with the second database 122.

Therefore, the processor 110 may not acquire a redo log 11 in which the first database 121 is already synchronized with the second database 122 but acquire only at least one redo log 12 in which the first database 121 is not synchronized with the second database 122. For example, at least one redo log 12 in which the first database 121 is not synchronized with the second database 122 may include a redo log including information of "data block address: 1, a:1→2", a redo log including information of "data block address: 3, b:7→9", a redo log including information of "control file sequence: 6, x:2→3", a redo log including information of "data block address: 2, d:8→9", a redo log including information of "data block address: 4, e:6→9", a redo log including information of "data block address: 5, c:4→6", and a redo log including information of "control file sequence: 6, x:3→4". The control file sequence may be information related the number of times when the control file is changed. For example, the control file sequence may be a value increased by 1 when changing the control file.

The processor 110 may acquire the data block address and information 20 on changed matters included in the control file based on at least one redo log. For example, the data block address and the information 20 on the changed matters included in the control file may include "data block address: 1, 2, 3, 4, 5" and "control file sequence: 5→6(x:2→3), 6→7(x:3→4)".

The processor 110 may acquire, from the second database 122, reference data 30 for the data block corresponding to the data block address included in the first database 121. For example, the processor 110 may acquire, from the second database 122, the reference data 30 corresponding to "data block address: 1, 2, 3, 4, 5" and "control file sequence: 5→6(x:2→3), 6→7(x:3→4)" in the first database 121.

The reference data 30 may be data for the data block stored in the storage of the storage unit 120 corresponding to the second database 122. For example, the reference data 30 may include data including information of "data block address: 1, a:2", data including information of "data block address: 2, d:8", data including information of "data block address: 3, b:7", data including information of "data block address: 4, e:6", and data including information of "data block address: 5, c:4".

The processor 110 may apply the reference data 30 acquired from the second database 122 to the data block included in the first database 121. Therefore, the processor 110 may acquire data 40 for the data block of the first database 121 which is synchronized with the data block of the second database 122. For example, the data 40 for the data block of the first database 121 which is synchronized may include data including information of "data block address: 1, a:3→2", data including information of "data block address: 2, d:9→8", data including information of "data block address: 3, b:9→7", data including information of "data block address: 4, e:9→6", and data including information of "data block address: 5, c:6→4".

The processor 110 may apply the changed matters to the control file in a reverse order based on the information on the changed matters. Therefore, the processor 110 may recover the control file to the state at the time point before the failure occurs in the first database 121. The processor 110 may acquire data 50 for a control file recovered to the state at the time point before the failure occurs in the first database 121. For example, the data 50 for the recovered control file may be data including information of "control file sequence: 7→6→5, x:4→3→2".

The processor 110 compares the modified first database 121 and second database 122 to determine whether the modified first database 121 and second database 122 are synchronized.

For example, the processor 110 may compare the data block of the modified first database 121 and the data block of the second database 122. The processor 110 compares the reference data 30 and the data 40 for the data block of the synchronized first database 121, and when the reference data 30 and the data 40 are the same as each other, the processor 110 may determine that the first database 121 and the second database 122 are synchronized with each other. Further, the processor 110 compares the reference data 30 and the data 40 for the data block of the synchronized first database 121, and when the reference data 30 and the data 40 are not the same as each other, the processor 110 may determine that the first database 121 and the second database 122 are not synchronized with each other.

As another example, the processor 110 may compare the control file of the modified first database 121 and the control file of the second database 122. The processor 110 compares the data 50 for the recovered control file and the control file of the second database 122, and when the data 50 and the control file of the second database 122 are the same as each other, the processor 110 may determine that the modified first database 121 and the second database 122 are synchronized with each other. Further, the processor 110 compares the data 50 for the recovered control file and the control file of the second database 122, and when the data 50 and the control file of the second database 122 are not the same as each other, the processor 110 may determine that the first database 121 and the second database 122 are not synchronized with each other.

As still another example, the processor 110 may compare the data block and the control file of the modified first database 121 and the data block and the control file of the second database 122. The processor 110 compares the data 40 for the data block of the first database 121 and the data 50 for the recovered control file, and the reference data 30 of the second database 122 and the control file, and when the data 40 and the data 50, and the reference data 30 and the control file are the same as each other, the processor 110 may determine that the first database 121 and the second database 122 are synchronized with each other. The processor 110 compares the data 40 for the data block of the first database 121 and the data 50 for the recovered control file, and the reference data 30 of the second database 122 and the control file, and when the data 40 and the data 50, and the reference data 30 and the control file are not the same as each other, the processor 110 may determine that the first database 121 and the second database 122 are not synchronized with each other.

When the processor 110 determines that the first database 121 and the second database 122 are not synchronized with each other, the processor 110 may reperform the method performed in order to implement the re-instantiation for the database in the first database 121. For example, when the processor 110 determines that the first database 121 and the second database 122 are not synchronized with each other, the processor 110 may reperform a process of acquiring at least one redo log in the first database 121, acquiring the data block address based on at least one redo log, acquiring the information on the changed matters included in the control file based on at least one redo log, and modifying the first database based on the data block address and the information on the changed matters.

Figure 3:
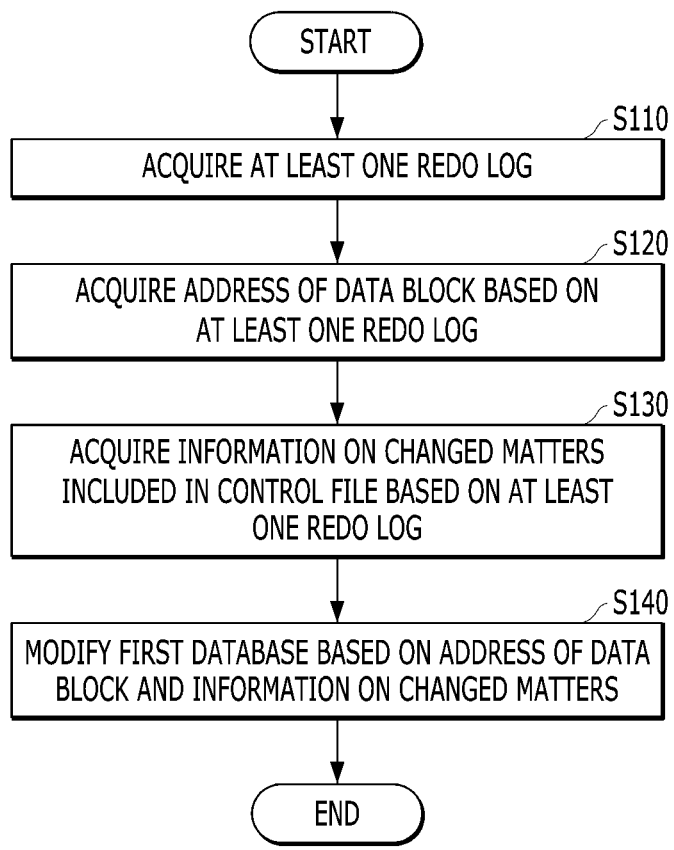
FIG. 3 is a flowchart for describing an example of implementing re-instantiation for a database by a computing device according to some exemplary embodiments of the present disclosure.

FIG. 3 is a flowchart for describing an example of implementing re-instantiation for a database by a computing device according to some exemplary embodiments of the present disclosure.

The processor 110 of the computing device 100 may acquire at least one redo log (S110).

At least one redo log may be information capable of identifying change contents for a structure and an organization for the data in the database and/or change contents related to the table, a column, the index, the data, etc., or a file including the information. For example, at least one redo log may be information capable of identifying contents related to change contents for a structure of data and an organization in the first database 121.

At least one redo log may include a log which is not synchronized with the second database 122 in the first database 121. The log and the redo log in the present specification may be used interchangeably with each other.

The processor 110 may acquire a data block address (DBA) based on at least one redo log (S120).

The address of the data block may include information regarding the position of the data block. For example, the data block address may include information indicating a position at which the data block is stored in the storage unit 120. Therefore, the processor 110 may access the data block based on the data block address.

The processor 110 may acquire information on changed matters included in a control file based on at least one redo log (S130).

The control file may include information on the structure and the organization of the storage unit 120. For example, the control file may include a path and a name of the data included in the storage unit 120, information of the log, etc.

When the changed matters for the structure and the organization of the storage unit 120 are generated, information on the changed matters of the control file may be updated. Accordingly, the control file may include information on changed matters related to at least one of change or modification of the data generated in the first database 121.

The processor 110 may modify the first database 121 based on the data block address and the information on the changed matters (S140).

The processor 110 may acquire, from the second database 122, reference data for the data block corresponding to the data block address included in the first database 121.

The processor 110 may apply the reference data acquired from the second database 122 to the data block included in the first database 121. Therefore, the data blocks included in the first database 121 and the second database 122 may be the same as each other.

The processor 110 may apply the changed matters to the control file in a reverse order based on the information on the changed matters. Therefore, the processor 110 may recover the control file to the state at the time point before the failure occurs in the first database 121. The processor 110 recovers the data block of the first database 121 and the control file to the state at the same time point to control the data block of the first database 121 and the control file to be matched with each other.

The processor 110 compares the modified first database 121 and second database 122 to determine whether the modified first database 121 and second database 122 are synchronized. When the processor 110 determines that the first database 121 and the second database 122 are not synchronized with each other, the processor 110 may reperform the method performed in order to implement the re-instantiation for the database in the first database 121. For example, when the processor 110 determines that the first database 121 and the second database 122 are not synchronized with each other, the processor 110 may reperform a process of acquiring at least one redo log in the first database 121, acquiring the data block address based on at least one redo log, acquiring the information on the changed matters included in the control file based on at least one redo log, and modifying the first database based on the data block address and the information on the changed matters.

The steps illustrated in FIG. 3 are exemplary steps. Therefore, it is also apparent that some of the steps of FIG. 3 may be omitted or additional steps may be present in the limit that does not depart from the scope of the idea of the spirit of the present disclosure. Further, specific contents regarding the components (e.g., components of the computing device 100) disclosed in FIG. 3 may be replaced with the contents described through FIGS. 1 and 2 above.

The existing re-instantiation may be implemented by using a flashback database function. Flashback database may be a function to return the database to a past time point desired by a user quickly instead of incomplete recovery using backup data. In the flashback database, a flashback log may be generated and stored, which leaves a state before change of the data block additionally simultaneously with the redo log every data change. When the flashback database is returned to the past time point, recovery is performed by using the flashback log up to the latest from the corresponding time point. However, since the flashback log should be generated and stored every data change during the operation, a work speed of the database may be lowered.

When a new replication database is intended to be constructed without re-instantiation in order to avoid the lowering of the work speed, the new replication database may be constructed by using backup data backed up from a new original database. However, since a process of generating the new backup data, a process of restoring the backup data in a position of the new replication database, and a process of recovering the backup data should be performed, when a scale of the database is large, a significantly long time may be required.

As described above by referring to FIGS. 1 to 3, the computing device 100 according to some exemplary embodiments of the present disclosure may perform the re-instantiation of the database by not separately storing and using the flashback log, but using only the redo log and control file generated during the operation in normal times. Therefore, since the computing device 100 does not require the process of separately storing the flashback log, the work speed may not be lowered in normal times.

The computing device 100 according to some exemplary embodiments of the present disclosure may not newly generate the new replication database from the first time, but modify a part of the existing original database (the first database 121) and use the modified original database as the replication database of the new original database (the second database 122). Therefore, since the computing device 100 modifies a part of the existing database and uses the modified partial database as the replication database, the computing device 100 may perform dualization of the database more quickly than the case of newly generating the replication database.

Figure 4:
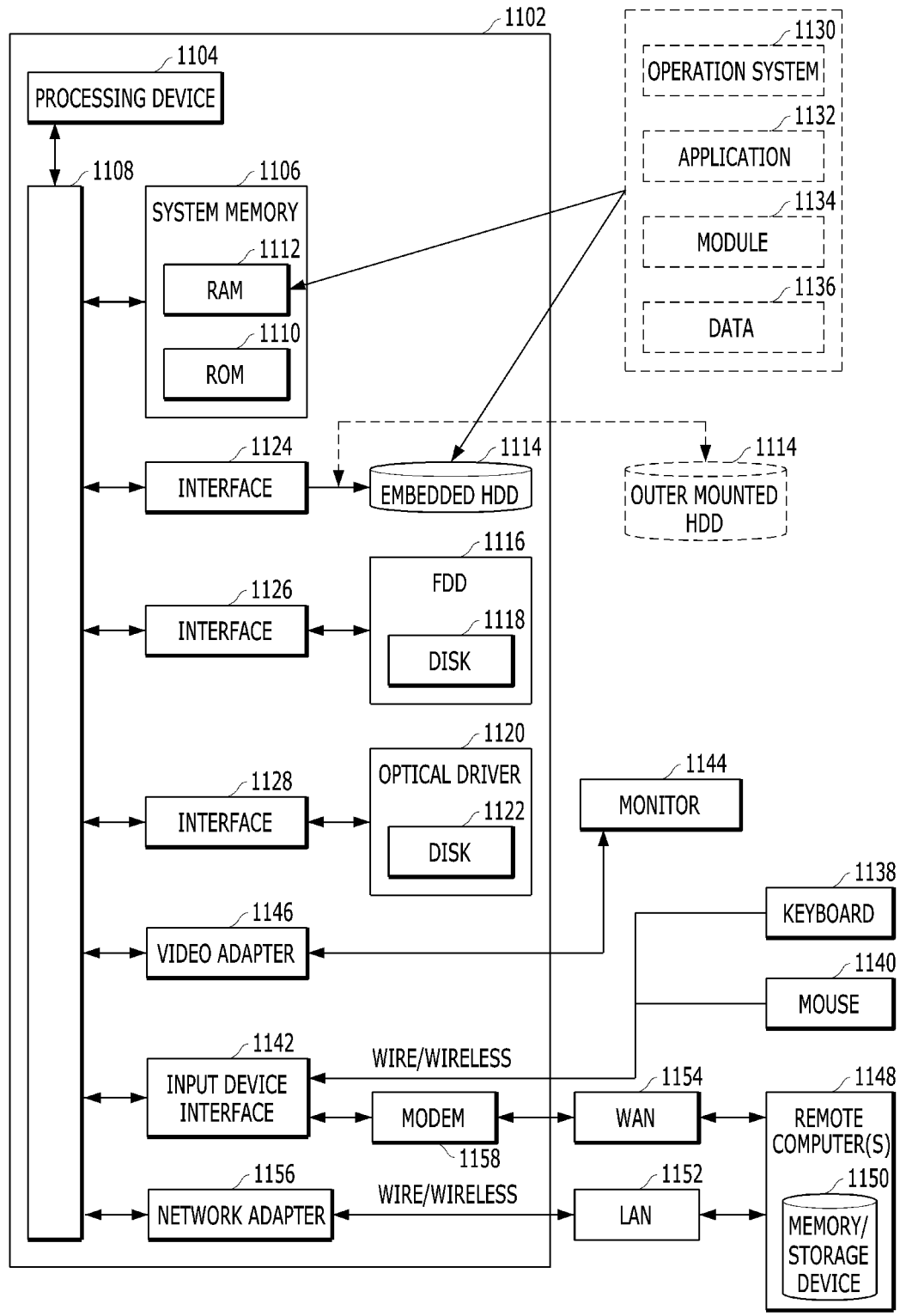
FIG. 4 illustrates a simple and general schematic view of an exemplary computing environment in which the exemplary embodiments of the present disclosure may be implemented.

FIG. 4 is a simple and general schematic diagram illustrating an example of a computing environment in which exemplary embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an exterior mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

What is claimed is:

1. A method comprising the steps of:
providing a first database initially operating as a primary database and a second database operating as a replication database, the first database having content stored therein as a plurality of data blocks, each data block having a respective address and storing respective values of a plurality of data fields, the first database having an associated first control file, the second database having content stored therein as a plurality of data blocks, each data block having a respective address and storing respective values of a plurality of data fields, the second database having an associated second control file;
during a time when the first database is operating as the primary database:
modifying the first database to change respective values of data fields in the first database and modifying the first control file, wherein the modifications of the data fields in the first database are recorded in a plurality of redo logs by respective block address and data field ID, and wherein the control file modifications are stored as sequential records in the redo logs;
synchronizing the second database content and the second control file with the first database content and first control file;
detecting a failure of the first database;
in response to detection of a failure of the first database:
making the second database the primary database and the first database the replication database;
identifying a first redo log, the first redo log specifying modifications made to the first database content and the first control file after the detection of the failure and that have not been synchronized to the second database;
acquiring from the first redo log a specific data block address and data field for which a value modification has been applied in the first database after the detection of the failure and that has not been synchronized to the second database;
retrieving, from a data block in the second database corresponding to the specific data block address of the first database, a current reference data value of the data field acquired from the first redo log;
applying the reference data acquired from the second database to the data field in the specific data block address in the first database;
acquiring from the first redo log information on a plurality of changes to the first control file; and
applying plurality of changes to the first control file acquired from the first redo log in a reverse sequential order.

2. The method of claim 1, wherein the control file includes information on the changed matters related to at least one of change or modification of the data, which occurred in the first database.

3. The method of claim 1, comprising:
comparing the modified first database and the second database, and determining whether the modified first database is synchronized with the second database.

4. The method of claim 3, comprising:
reperforming the method of claim 1 in the first database when it is determined that the first database and the second database are not synchronized with each other.

5. A non-transitory computer readable medium comprising a computer program for database re-instantiation in a computer system having a first database configured to operate as a primary database and a second database configured to operate as a replication database, the first database having content stored therein as a plurality of data blocks, each data block having a respective address and storing respective values of a plurality of data fields, the first database having an associated first control file, the second database having content stored therein as a plurality of data blocks, each data block having a respective address and storing respective values of a plurality of data fields, the second database having an associated second control file, the computer program comprising instructions for causing the computer to perform the method of:
during a time when the first database is operating as the primary database:
modifying the first database to change respective values of data fields in the first database and modifying the first control file, wherein the modifications of the data fields in the first database are recorded in a plurality of redo logs by respective block address and data field ID, and wherein the control file modifications are stored as sequential records in the redo logs;
synchronizing the second database content and the second control file with the first database content and first control file;
detecting a failure of the first database;
in response to detection of a failure of the first database:
making the second database the primary database and the first database the replication database;
identifying a first redo log, the first redo log specifying modifications made to the first database content and the first control file after the detection of the failure and that have not been synchronized to the second database;
acquiring from the first redo log a specific data block address and data field for which a value modification has been applied in the first database after the detection of the failure and that has not been synchronized to the second database;
retrieving, from a data block in the second database corresponding to the specific data block address of the first database, a current reference data value of the data field acquired from the first redo log;
applying the reference data acquired from the second database to the data field in the specific data block address in the first database;
acquiring from the first redo log information on a plurality of changes to the first control file; and
applying plurality of changes to the first control file acquired from the first redo log in a reverse sequential order.

6. A computing system for implementing re-instantiation for a database, comprising:
a processor;
a data store comprising a first storage area having a first database stored therein and a second storage area having a second database stored therein, the first database having content stored therein as a plurality of data blocks, each data block having a respective address and storing respective values of a plurality of data fields, the first database having an associated first control file, the second database having content stored therein as a plurality of data blocks, each data block having a respective address and storing respective values of a plurality of data fields, the second database having an associated second control file;
the processor configured to, during a time that computing system being in a state where the first database is operating as a primary database and the second database is operating as a replication database:
modify the first database to change respective values of data fields in the first database and modify the first control file, wherein the modifications of the data fields in the first database are recorded in a plurality of redo logs by respective block address data field ID, and wherein the control file modifications are stored as sequential records in the redo logs;
synchronize the second database content and the second control file with the first database content and first control file;
detect a failure of the first database;
in response to detection of a failure of the first database:
make the second database the primary database and the first database the replication database;
identify a first redo log, the first redo log specifying modifications made to the first database content and the first control file after the detection of the failure and that have not been synchronized to the second database;
acquire from the first redo log a specific data block address and data field for which a value modification has been applied in the first database after the detection of the failure and that has not been synchronized to the second database;
retrieve, from a data block in the second database corresponding to the specific data block address of the first database, a current reference data value of the data field acquired from the first redo log;
apply the reference data acquired from the second database to the data field in the specific data block address in the first database;
acquire from the first redo log information on a plurality of changes to the first control file; and
apply the plurality of changes to the first control file acquired from the first redo log in a reverse sequential order.

* * * * *